(No Model.)

P. MILLER.
WIRE BASKET FOR COOKING UTENSILS.

No. 348,988. Patented Sept. 14, 1886.

Witnesses
W. B. Corwin
J. A. Burns.

Inventor
Philip Miller
by his attys
Bakewell & Kerr

UNITED STATES PATENT OFFICE.

PHILIP MILLER, OF SHARPSBURG, PENNSYLVANIA.

WIRE BASKET FOR COOKING UTENSILS.

SPECIFICATION forming part of Letters Patent No. 348,988, dated September 14, 1886.

Application filed July 31, 1885. Serial No. 173,137. (No model.)

*To all whom it may concern:*

Be it known that I, PHILIP MILLER, of Sharpsburg, in the county of Allegheny and State of Pennsylvania, have invented a new and useful Improvement in Wire Baskets for Cooking Utensils; and I do hereby declare the following to be a full, clear, and exact description thereof.

The object of my improvement is to provide a removable basket to be placed inside of pots and other cooking utensils, for the purpose of containing the material to be cooked, so as to prevent its coming in contact with the side of the pot, and afford an easy means for removing it therefrom and draining it from the water in which it may have been immersed in the pot.

To enable others skilled in the art to make and use my invention, I will now describe it by reference to the accompanying drawings, in which—

Figure 1:
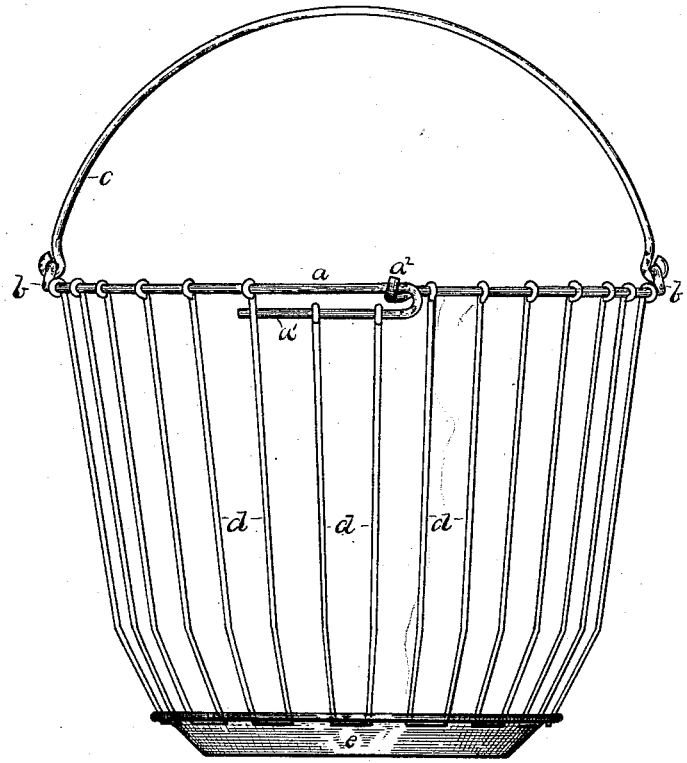
Figure 2:
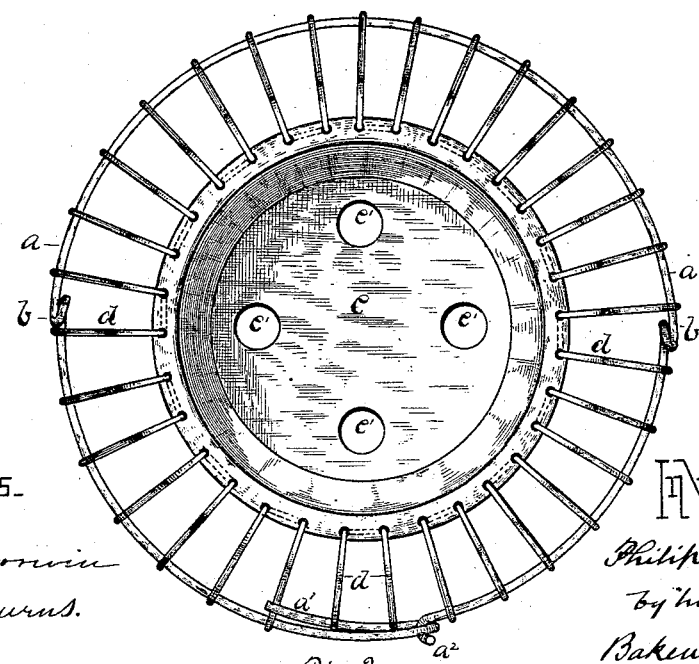

Figure 1 is a side elevation of my improvement, and Fig. 2 is a plan view.

My improved basket is provided with wire sides and a dish-shaped bottom, the latter being perforated. The top edge of the basket is formed by a wire ring, $a$, which is preferably bent at opposite points to form handle lugs or eyes $b$, by which a bail or handle, $c$, may be attached. Its sides are composed of vertical wires $d$, which in this instance are made staple-shaped, and the bottom pan or disk, $e$, is suspended to the lower ends of the wires, being secured thereto in such a manner that the basket will rest upon the pan as a bottom, as indicated in Fig. 1. The pan $e$ is provided with perforations $e'$, in any desired manner, for the purpose of draining the same.

The article to be cooked—such as potatoes, meat, or other substance—is placed in the basket, and then the latter placed in the pot. When the cooking is completed, the article is removed by raising the basket out of the pot, which also enables it to be thoroughly drained of the water in which it was cooked.

It sometimes happens that the basket, being expanded by the heat to which it is exposed, will stick in the pot or will not enter sufficiently to properly immerse the material contained therein. To provide against this contingency, I have made the ring $a$ adjustable by bending back one end, $a'$, over a hook or loop formed in the other end, $a^2$, and securing said end $a'$ by the hook ends of one or more staple-wires, $d$, as illustrated in the drawings. This construction, together with the vertical side wires, permits the top or wider part of the basket to contract or be compressed, so that it may be freely inserted into or withdrawn from a pot of smaller diameter.

My improvement is cheap, useful, and convenient.

I am aware that wire baskets or vessels in themselves are not new, and that they have been used for washing or sifting ashes or other purposes, and I do not desire to claim the same, broadly.

What I claim as my invention, and desire to secure by Letters Patent, is—

1. A wire basket for cooking purposes, having a top ring, staple-wire sides, and a dish-shaped bottom, substantially as and for the purpose specified.

2. A wire basket for cooking purposes, having a top ring, the ends of which are bent over each other and adjustably secured, in combination with vertical wire sides and a flat bottom, substantially as and for the purposes described.

In testimony whereof I have hereunto set my hand this 29th day of July, A. D. 1885.

PHILIP MILLER.

Witnesses:
W. B. CORWIN,
THOMAS B. KERR.